(12) United States Patent
Testa et al.

(10) Patent No.: US 8,983,292 B2
(45) Date of Patent: Mar. 17, 2015

(54) ELECTRICAL SIGNAL PACKET ROUTING

(75) Inventors: Francesco Testa, Pomezia Rome (IT); Antonio D'Errico, Calci (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 285 days.

(21) Appl. No.: 13/518,215

(22) PCT Filed: Jan. 18, 2010

(86) PCT No.: PCT/EP2010/050519
§ 371 (c)(1),
(2), (4) Date: Sep. 10, 2012

(87) PCT Pub. No.: WO2011/076442
PCT Pub. Date: Jun. 30, 2011

(65) Prior Publication Data
US 2012/0328292 A1    Dec. 27, 2012

(51) Int. Cl.
*H04J 14/02* (2006.01)
*H04Q 11/00* (2006.01)
*H04J 14/00* (2006.01)

(52) U.S. Cl.
CPC ....... *H04Q 11/0005* (2013.01); *H04Q 11/0066* (2013.01); *H04Q 2011/0011* (2013.01); *H04Q 2011/0018* (2013.01); *H04Q 2011/0032* (2013.01); *H04Q 2011/0039* (2013.01); *H04Q 2011/0056* (2013.01)
USPC ............. 398/49; 398/45; 398/48; 398/75; 398/47; 370/404; 370/380

(58) Field of Classification Search
CPC .......... H04Q 11/0005; H04Q 11/0066; H04Q 11/0062; H04Q 2011/0016; H04Q 2011/0032
USPC .................... 398/45, 48, 49
See application file for complete search history.

(56) References Cited

U.S. PATENT DOCUMENTS 5,005,166 A * 4/1991 Suzuki et al. ................. 398/47
5,825,517 A * 10/1998 Antoniades et al. .......... 398/50
6,317,529 B1 * 11/2001 Kashima ....................... 385/16

(Continued)

OTHER PUBLICATIONS

Gripp ["Optical Switch Fabrics for Ultra-High-Capacity IP Routers" Journal of Lightwave Technology Vo.21 No. 11, Nov. 2003] in view of Yoo [US Pub No. 2003/0133641].*

(Continued)

*Primary Examiner* — Oommen Jacob
(74) *Attorney, Agent, or Firm* — Baker Botts, LLP (57) ABSTRACT

A packet switch 40 comprises wavelength tunable optical transmitters 12, an optical switch fabric 42, optical detectors 30 and a controller 32. The transmitters 12 are arranged to receive at least one electrical signal packet to be switched and convert it into a corresponding optical signal packet at an input wavelength. The optical switch fabric 42 comprises an ingress stage 44 comprising wavelength selective routers 46 and an egress stage 50 comprising wavelength selective routers 54 and tunable wavelength converters 26 arranged to receive an optical signal at the input wavelength and to output an optical signal at an output wavelength. The controller 32 is arranged to set the input wavelength of a transmitter 12 and the output wavelength of a wavelength converter to configure a path across the switch fabric 42 connecting the transmitter 12 to a detector 30. A communications network router 90 comprises an input module 92, a packet switch 40, an output module 96 and a scheduler 94.

12 Claims, 8 Drawing Sheets

(56) References Cited

U.S. PATENT DOCUMENTS

| | | | |
|---|---|---|---|
| 6,549,313 | B1* | 4/2003 | Doerr et al. ............... 385/16 |
| 7,394,806 | B2* | 7/2008 | Beshai et al. ............. 370/380 |
| 7,430,346 | B2* | 9/2008 | Jennen ....................... 385/17 |
| 2003/0043430 | A1* | 3/2003 | Handelman ............... 359/128 |
| 2003/0133641 | A1* | 7/2003 | Yoo ............................ 385/14 |
| 2004/0037301 | A1* | 2/2004 | Shachar et al. ........... 370/404 |
| 2005/0135806 | A1* | 6/2005 | Mishra et al. ............... 398/45 |
| 2010/0021165 | A1* | 1/2010 | Nuzman et al. ............. 398/75 |

OTHER PUBLICATIONS

Neilson ["Photonics for Switching and Routing" IEEE Journal of Selected Topics in Quantum Electronics vol.12 No. 4 Jul./Aug. 2006].*

International Search Report for PCT/EP2010/050519 mailed Nov. 5, 2010.

P. Bernasconi et al., "Optical Switch Fabrics for Ultra-High-Capacity IP Routers", Journal of Lightwave Technology, vol. 21, No. 11, Nov. 1, 2003, pp. 2839-2850.

J. Cheyns et al., "Clos Lives on in Optical Packet Switching", IEEE Communications Magazine, vol. 42, No. 2, Feb. 1, 2004, pp. 114-121.

J. Simsarian et al., "Highly-Scalable Load-Balanced Router with Optical Switch Fabric", Electronics Letters, IEEE Stevenage, vol. 40, No. 25, Dec. 9, 2004, pp. 1600-1602.

S. Nicholes et al., "The World's First InP 8x8 Monolithic Tunable Optical Router (MOTOR) Operating at 40 Gbps Line Rate per Port", 2009 Optical Society of America, 2009 OSA/OFC/NFO EC, 3 pages.

D. Neilson, Photonics for Switching and Routing, IEEE Journal of Selected Topics in Quantum Electronics, vol. 12, No. 4, Jul./Aug. 2006, pp. 669-678.

R. Tucker, "Optical Packet Switching: A Reality Check", ARC Special Research Centre for Ultra-Broadband Information Networks, Department of Electrical and Electronic Engineering, Science Diet, 8 pages.

* cited by examiner

ELECTRICAL SIGNAL PACKET ROUTING

This application is the U.S. national phase of International Application No. PCT/EP2010/050519 filed 18 Jan. 2010 which designated the U.S. and claims priority to EP 09180618.2 filed 23 Dec. 2009, the entire contents of each of which are hereby incorporated by reference.

TECHNICAL FIELD

The invention relates to electrical signal packet routing and in particular to a packet switch, a communications network router comprising said packet switch, a method of routing electrical signal packets and a method of scheduling electrical signal packets for routing in a communications network router.

BACKGROUND

Multi-terabit routers in communications networks currently use electrical crossbar switching fabrics to perform switching of electrical packets between line cards in routers having a capacity of tens of terabits per second or more. The limited number of ports in the switch elements of the switching fabric means that complex switching fabrics comprising many switch elements are required in order to provide the required routing capacity. Such high capacity routers typically consist of a multi-rack hardware configuration comprising many line card racks and switch fabric racks. While this type of hardware configuration can be used to construct large capacity switch fabrics, they have high power consumption and a large footprint, both of which scale rapidly to unacceptable levels as the switch capacity is increased.

Various solutions for routing in optical communications networks have been proposed based on all-optical routing, so that no conversion into the electrical domain is required. R. S. Tucker, "Optical Packet Switching: A Reality Check", Optical Switching and Network Volume 5, 2008, reports various optical switch fabrics for all-optical packet switched applications, including an optical switch fabric comprising rapidly tunable wavelength converters and arrayed waveguide gratings.

SUMMARY

It is an object to provide an improved packet switch. It is a further object to provide an improved communications network router. It is a further object to provide an improved method of routing electrical signal packets. It is a further object to provide an improved method of scheduling electrical signal packets for routing in a communications network router.

A first aspect of the invention provides a packet switch comprising wavelength tunable optical transmitters, an optical switch fabric, optical detectors and a controller. The packet switch comprises a first plurality of said wavelength tunable optical transmitters. Each said wavelength tunable optical transmitter is arranged to receive at least one electrical signal packet to be switched. Each said optical transmitter is arranged to convert said at least one received electrical signal packet into a corresponding optical signal packet at one of a second plurality of input wavelengths. Said optical switch fabric is arranged to receive said at least one optical signal packet. Said optical switch fabric comprises an ingress stage and an egress stage. Said ingress stage comprises a third plurality of wavelength selective routers. Said egress stage comprises a fourth plurality of wavelength selective routers and a fifth plurality of wavelength tunable wavelength converters. Each said wavelength tunable wavelength converter is respectively provided before an input port of a said wavelength selective router. Each said wavelength tunable wavelength converter is arranged to receive an optical signal at a respective said input wavelength and to output a corresponding optical signal at a respective output wavelength. The packet switch comprises a sixth plurality of said optical detectors. Each said optical detector is arranged to receive an optical signal packet from said egress stage and to convert said optical signal packet into an output electrical signal packet. Said controller is arranged to configure a path across said optical switch fabric connecting a said optical transmitter to a respective said optical detector. Said controller is arranged to set said input wavelength for said optical transmitter and to set said output wavelength for a respective said wavelength converter in said path.

The packet switch may be used to implement switching functions in level two and level three switches of a communications network. The packet switch may provide lower power consumption and a smaller footprint than an equivalent capacity electrical switch. The packet switch may be used within an optical communications network without the input wavelengths being limited to those within the ITU-T grid since the optical signal packet remains internal to the packet switch. The structure of the switch fabric may enable the capacity of the packet switch to be scaled.

In an embodiment, said ingress stage wavelength selective routers each comprise an eighth plurality of input ports and a said second plurality of output ports. In said egress stage each said wavelength selective router comprises a ninth plurality of input ports and a tenth plurality of output ports. Each said wavelength converter is coupled between its respective said input port and a respective said output port of said ingress stage and is arranged to receive an optical signal packet at a respective wavelength and to output an optical signal packet at a respective one of a said sixth plurality of output wavelengths.

The wavelength selective routers may thus route each input wavelength to a different output port and the wavelength converters may change the wavelength of an optical signal packet before it is routed by a wavelength selective router in the egress stage. The output port to which an optical signal packet is routed from a respective optical transmitter may therefore be selected by controlling one or both of the respective input wavelength and the respective output wavelength.

In an embodiment, said optical switch fabric further comprises at least one intermediate stage provided between said ingress stage and said egress stage. Said at least one intermediate stage comprises an eleventh plurality of wavelength selective routers each comprising a twelfth plurality of input ports and a thirteenth plurality of output ports. Each said input port is provided with a wavelength tunable wavelength converter arranged to receive an optical signal packet at a respective wavelength and to output an optical signal packet at a respective one of a said thirteenth plurality of output wavelengths. Each said wavelength converter is coupled between its respective said input port and a respective said output port of a preceding switch stage.

The structure of the switch fabric may enable the capacity of the packet switch to be further scaled. The output port to which an optical signal packet is routed from a respective optical transmitter may be selected by controlling one or more of the respective input wavelength, intermediate wavelength and output wavelength.

In an embodiment, said ingress stage, said egress stage and said at least one intermediate stage are arranged as a non-blocking switch network. In an embodiment, said non-blocking switch network comprises a Clos network. The packet switch may therefore be configured with a strictly non-blocking optical switch fabric.

In an embodiment, said wavelength selective routers comprise arrayed waveguide gratings. Arrayed waveguide gratings are passive devices and the packet switch may therefore be constructed with a lower power consumption and smaller footprint than an equivalent capacity electrical switch.

In an embodiment, said arrayed waveguide gratings are cyclic arrayed waveguide gratings. The controller may thus configure a path across the optical switch fabric which further depends upon the input port to which an optical transmitter is coupled.

In an embodiment, said ingress stage comprises a said third plurality of cyclic arrayed waveguide gratings each comprising a said eighth plurality of input ports and a said second plurality of output ports. Said egress stage comprises a said second plurality of cyclic arrayed waveguide gratings each comprising a said third plurality of input ports and a said eighth plurality of output ports.

In an embodiment, said ingress stage comprises a said third plurality of cyclic arrayed waveguide gratings each comprising a said eighth plurality of input ports and a said second plurality of output ports. Said optical switch fabric comprises one intermediate stage which comprises a said second plurality of cyclic arrayed waveguide gratings each comprising a said third plurality of input ports and a said third plurality of output ports. Said egress stage comprises a said third plurality of cyclic arrayed waveguide gratings each comprising a said second plurality of input ports and a said eighth plurality of output ports.

In an embodiment, said wavelength tunable optical transmitters comprise tunable lasers.

In an embodiment, said sixth plurality is equal to said first plurality. The packet switch thus comprises the same number of optical transmitters and optical detectors.

A second aspect of the invention provides a communications network router comprising at least one input module, at least one output module, a packet switch, and a scheduler. Said at least one input module is arranged to receive at least one electrical signal packet to be routed. Said at least one input module is arranged to provide said received at least one electrical signal packet to a respective said wavelength tunable optical transmitter. Said at least one output module is arranged to output at least one electrical signal packet. Said at least one output module being arranged to receive at least one electrical signal packet from a respective said optical detector. Said packet switch is as described in any of the above paragraphs relating to the first embodiment of the invention. Said scheduler is arranged to select a said input wavelength for said optical transmitter and to select a said output wavelength for a respective said wavelength converter to thereby select a path across said optical switch fabric from said optical transmitter. Said scheduler is arranged to generate a wavelength control signal indicative of said selected wavelengths and to transmit said control signal to said controller.

The router may be used to implement switching functions in level two and level three switches of a communications network. The router may provide lower power consumption and a smaller footprint than an equivalent capacity electrical router. The router may be used within an optical communications network without the input wavelengths being limited to those within the ITU-T grid since the optical signal packet remains internal to the packet switch. The structure of the switch fabric may enable the capacity of the router to be scaled.

In an embodiment, said at least one input module and said at least one output module comprise a line card.

In an embodiment, said wavelength tunable optical transmitters are provided within said input module and are arranged to receive said electrical signal packets to be routed.

In an embodiment, said wavelength tunable optical transmitters are provided outside said input module and said router further comprises input electrical-to-optical signal conversion apparatus, an input optical link, and input optical-to-electrical signal conversion apparatus. Said input electrical-to-optical signal conversion apparatus is provided within said input module. Said input electrical-to-optical signal conversion apparatus is arranged to receive said electrical signal packets and to convert said electrical signal packets into input optical signal packets. Said input optical link is provided between said input electrical-to-optical signal conversion apparatus and said input optical-to-electrical signal conversion apparatus, and is arranged to deliver said input optical signal packets to said input optical-to-electrical signal conversion apparatus. Said input optical-to-electrical signal conversion apparatus is arranged to receive said input optical signal packets and to convert said input optical signal packets into electrical signal packets to be switched. Said input optical-to-electrical signal conversion apparatus is arranged to provide said electrical signal packets to be switched to respective said optical transmitters.

In an embodiment, said optical detectors are provided within said output module and are arranged to receive said output electrical signal packets.

In an embodiment, said optical detectors are provided outside said output module and said router further comprises output electrical-to-optical signal conversion apparatus, an output optical link, and output optical-to-electrical signal conversion apparatus. Said output optical-to-electrical signal conversion apparatus is provided within said output module. Said output electrical-to-optical signal conversion apparatus is arranged to receive said output electrical signal packets from respective said optical detectors and to convert said output electrical signal packets into output optical signal packets. Said output optical link is provided between said output electrical-to-optical signal conversion apparatus and said output optical-to-electrical signal conversion apparatus, and is arranged to deliver said output optical signal packets to said output optical-to-electrical signal conversion apparatus. Said output optical-to-electrical signal conversion apparatus is arranged to receive said output optical signal packets and to convert said output optical signal packets into electrical signal packets to be output from said router.

A third aspect of the invention provides a method of routing electrical signal packets. The method comprises receiving at least one electrical signal packet to be routed. The method comprises selecting an input wavelength from a first plurality of wavelengths and an output wavelength from a second plurality of wavelengths. The method comprises converting said electrical signal packet into at least one corresponding optical signal packet at said input wavelength. The method comprises receiving said optical signal packet at an input port of a first wavelength selective router. Said first wavelength selective router comprises a third plurality of input ports and a said first plurality of output ports. Said method comprises routing said at least one optical signal packet to one of said output ports in dependence on said input wavelength. Said method comprises subsequently converting said input wavelength to said output wavelength. Said method comprises receiving said at least one optical signal packet at an input port of a second wavelength selective router. Said second wavelength selective router comprises a fourth plurality of input ports and a said second plurality of output ports. Said method comprises routing said at least one optical signal packet to one of said output ports in dependence on said output wavelength. Said method comprises subsequently converting said at least one optical signal packet at said output wavelength into at least one corresponding output electrical signal packet.

The method may allow an electrical signal packet to be routed in the optical domain by selecting the input wavelength and the output wavelength. The method enables the route of the electrical signal packet across a router to be controlled by selecting the input wavelength and the output wavelength.

In an embodiment, said method further comprises selecting an intermediate wavelength from a fifth plurality of wavelengths. Said step of subsequently converting said input wavelength to an output wavelength comprises converting said input wavelength to said intermediate wavelength and receiving said at least one optical signal packet at an input port of a further wavelength selective router. Said further wavelength selective router comprises a sixth plurality of input ports and a said fifth plurality of output ports. Said method comprises routing said at least one optical signal packet to one of said output ports in dependence on said intermediate wavelength. Said method comprises subsequently converting said intermediate wavelength into said output wavelength.

The method may allow an electrical signal packet to be routed in the optical domain by selecting the input wavelength and the output wavelength. The method enables the route of the electrical signal packet across a router to be controlled by selecting the input wavelength, the intermediate wavelength and the output wavelength.

In an embodiment said method comprises receiving a plurality of electrical signal packets to be routed. Said method comprises arranging said electrical signal packets into groups of signal packets. Said method comprises selecting a said input wavelength and a said output wavelength for each said group of electrical signal packets. Said method comprises converting each said group of electrical signal packets into a group of optical signal packets at a respective said input wavelength. Said method comprises receiving each said group of optical signal packets at a respective input port of said first wavelength selective router and routing each said group of optical signal packets to a respective said output port in dependence on said respective input wavelength. Said method comprises subsequently converting each said input wavelength to said respective output wavelength. Said method comprises receiving each said group of optical signal packets at a respective input port of said second wavelength selective router and routing each said group of optical signal packets to a respective said output port in dependence on said respective output wavelength. Said method comprises subsequently converting each said group of optical signal packets at said output wavelengths into corresponding output electrical signal packets.

The method may allow electrical signal packets to be routed together in groups, the route of a group across a controller being controlled by selecting the input wavelength and the output wavelength.

In an embodiment, said wavelength selective routers comprise arrayed waveguide gratings. The method may allow electrical signal packets to be routed solely by selecting the input wavelength and the output wavelength.

In an embodiment, said arrayed waveguide gratings are cyclic arrayed waveguide gratings. The controller may thus configure a path across the optical switch fabric which further depends upon the input port to which an optical transmitter is coupled.

A fourth aspect of the invention provides a method of scheduling electrical signal packets for routing in a communications network router. Said router comprises a packet switch comprising a first plurality of wavelength tunable optical transmitters arranged to transmit at one of a second plurality of input wavelengths, a third plurality of optical detectors, and an optical switch fabric provided between said transmitters and said detectors. Said optical switch fabric comprises an ingress stage comprising a fourth plurality of wavelength selective routers and an egress stage comprising a fifth plurality of wavelength selective routers and a sixth plurality of wavelength tunable wavelength converters. Said wavelength tunable wavelength converters are arranged to convert an optical signal at a said input wavelength to an output wavelength. Said method comprises receiving at least one electrical signal packet at a said wavelength tunable optical transmitter. Said method comprises selecting a said input wavelength and a said output wavelength to thereby select a path across said optical switch fabric from said optical transmitter such that said optical transmitter is connected to only one said optical detector, and said optical detector is connected only to said optical transmitter.

The method may allow electrical signal packets to be scheduled for routing by selecting the input wavelength and the output wavelength.

In an embodiment, said method comprises receiving a plurality of electrical signal packets at said wavelength tunable optical transmitters. Said electrical signal packets each comprise destination information. Said method comprises arranging said electrical signal packets at each said wavelength tunable optical transmitter into at least one group in dependence on their respective said destination information. Said method comprises selecting one said group at each said wavelength tunable optical transmitter for routing during a time slot and selecting a said input wavelength and a said output wavelength for each said group in dependence on said destination information.

The method may allow electrical signal packets to be scheduled for routing in groups having a common destination by selecting the input wavelength and the output wavelength.

In an embodiment, said time slot has a duration at least as long as a time required for a group to traverse said optical switch fabric.

In an embodiment, said wavelength selective routers comprise arrayed waveguide gratings. The method may allow electrical signal packets to be scheduled for routing solely by selecting the input wavelength and the output wavelength.

In an embodiment, said arrayed waveguide gratings are cyclic arrayed waveguide gratings. The method may allow electrical signal packets to be scheduled for routing further depending upon the input port to which said optical transmitter is coupled.

A fifth aspect of the invention provides a data carrier having computer readable instructions embodied therein. The said computer readable instructions are for providing access to resources available on a processor. The computer readable instructions comprise instructions to cause the processor to perform any of the above steps of the method of routing electrical signal packets.

A sixth aspect of the invention provides a data carrier having computer readable instructions embodied therein. The said computer readable instructions are for providing access to resources available on a processor. The computer readable instructions comprise instructions to cause the processor to perform any of the above steps of the method of scheduling electrical signal packets for routing in a communications network router.

DETAILED DESCRIPTION

Figure 1:
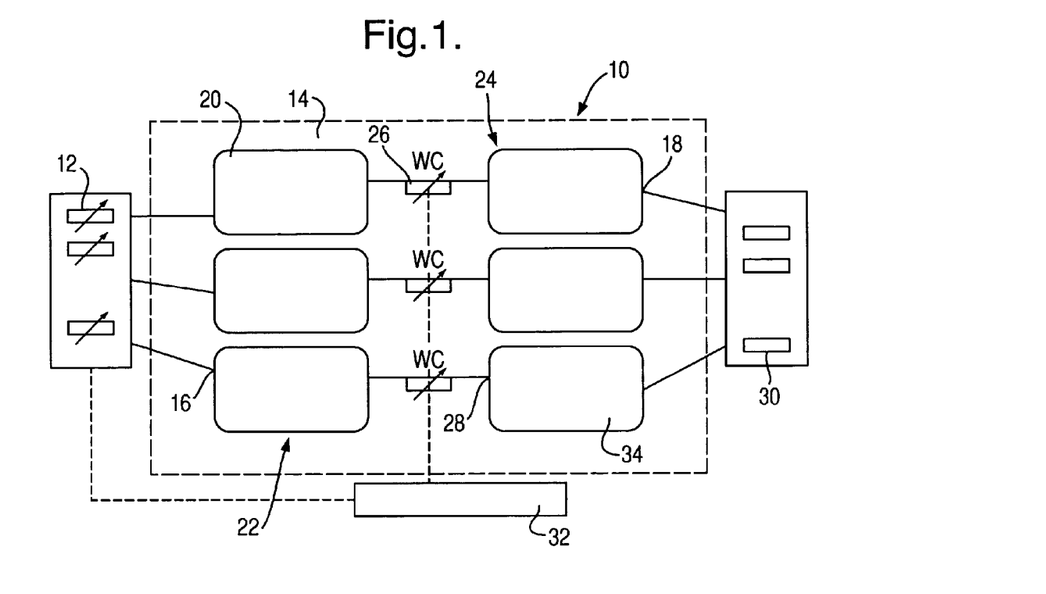
FIG. 1 is a schematic representation of a data packet switch according to a first embodiment of the invention.

Referring to FIG. 1, a first embodiment of the invention provides a packet switch 10 comprising wavelength tunable optical transmitters 12, an optical switch fabric 14, optical detectors 30 and a controller 32. The packet switch 10 comprises a first plurality of wavelength tunable optical transmitters 12. Each wavelength tunable optical transmitter 12 is arranged to receive at least one electrical signal packet to be switched by the packet switch 10. Each optical transmitter 12 is arranged to convert a received electrical signal packet into a corresponding optical signal packet at one of a second plurality of input wavelengths.

The optical switch fabric 14 comprises an ingress stage 22 and an egress stage 24. The ingress stage 22 comprises a third plurality of wavelength selective routers 20. The optical switch fabric 14 is arranged to receive the optical signal packet at the ingress stage 22, at one of the wavelength selective routers 20. Each optical transmitter 12 is coupled to a respective input port 16 of a wavelength selective router 20 of the ingress stage 22.

The egress stage 24 comprises a fourth plurality of wavelength selective routers 34 and a fifth plurality of wavelength tunable wavelength converters 26. Each wavelength converter 26 is provided before an input port 28 of a wavelength selective router 34 of the egress stage 24. The wavelength converters 26 are arranged to receive an optical signal at a respective input wavelength and to output a corresponding optical signal at a respective output wavelength. The wavelength of the optical signal packet may therefore be modified on transmission through a respective wavelength converter 26 prior to delivery to a respective wavelength selective router 34 of the egress stage 24.

The packet switch 10 comprises a sixth plurality of optical detectors 30. Each optical detector 30 is arranged to receive an optical signal packet from the egress stage 24 and to convert the optical signal packet into an output electrical signal packet.

The controller 32 is arranged to configure a path across the optical switch fabric 14 connecting an optical transmitter 12 to a respective optical detector 30. The controller 32 is arranged to set the input wavelength for the optical transmitter 12 and to set the output wavelength for a respective wavelength converter between the optical transmitter 12 and a selected optical detector 30, to thereby define a path between the optical transmitter 12 and the optical detector 30.

Figure 2:
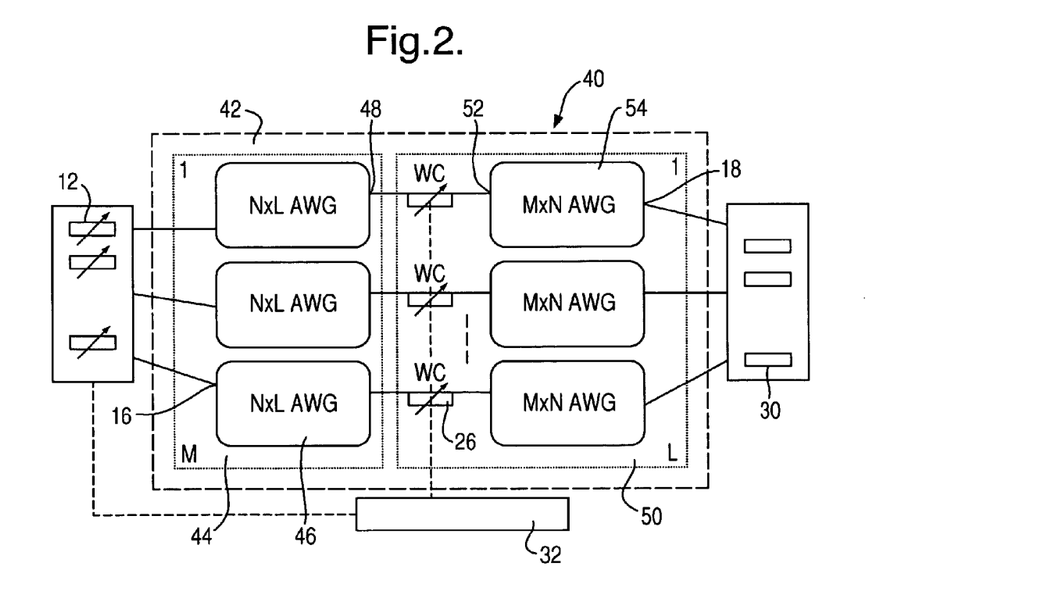
FIG. 2 is a schematic representation of a data packet switch according to a second embodiment of the invention.

Referring to FIG. 2, a second embodiment of the invention provides a packet switch 40 which is substantially the same as the packet switch 10 of the first embodiment, with the following modifications. The same reference numbers are retained for corresponding features.

In this embodiment, the packet switch 40 comprises an optical switch fabric 42 comprising an ingress stage 44 and an egress stage 50. The ingress stage 44 comprises a third plurality, M, of wavelength selective routers 46. The wavelength selective routers 46 comprise arrayed waveguide gratings (AWG) each comprising an eighth plurality, N, of input ports 16 and a said second plurality, L, of output ports 48.

The egress stage 50 comprises a fourth plurality, L, of wavelength selective routers 54. In this example, the number of wavelength selective routers 54 in this example comprises the said second plurality, L. The wavelength selective routers 54 comprise arrayed waveguide gratings (AWG). Each AWG 54 comprises a ninth plurality of input ports 52 and a tenth plurality of output ports 18. In this example, the AWGs 54 comprise a said third plurality, M, of input ports 52 and a said eighth plurality, N, of output ports 18. Each wavelength converter 26 is coupled between a respective input port 52 of an AWG 54 of the egress stage 50 and a respective output port 48 of an AWG 46 of the ingress stage 44. Each wavelength converter 26 is arranged to receive an optical signal packet at a respective wavelength and to output an optical signal packet at a respective one of a said eighth plurality of output wavelengths.

Figure 3:
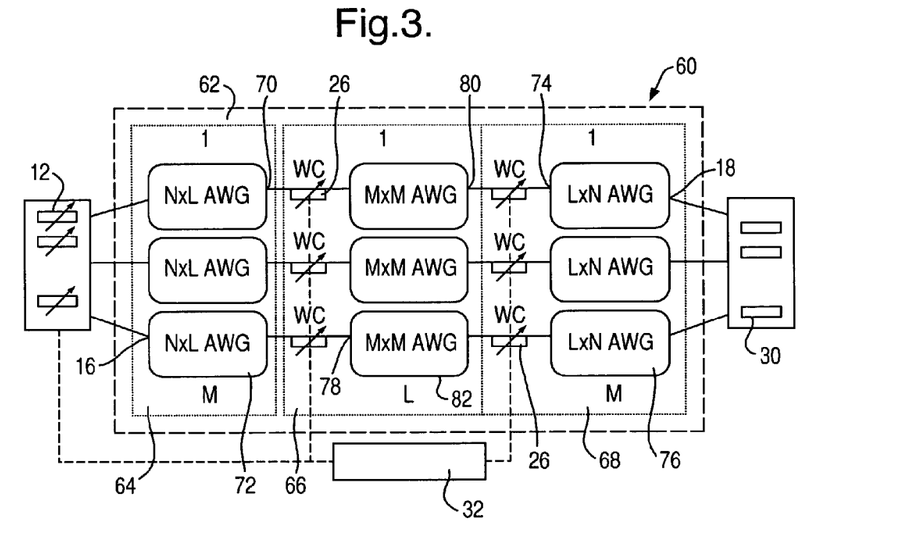
FIG. 3 is a schematic representation of a data packet switch according to a third embodiment of the invention.

A third embodiment of the invention provides a packet switch 60, as shown in FIG. 3. The packet switch 60 is substantially the same as the packet switch 40 of the previous embodiment, with the following modifications. The same reference numbers are retained for corresponding features.

In this embodiment, the packet switch 60 comprises an optical switch fabric 62 comprising an ingress stage 64, an intermediate stage 66 and an egress stage 68. The ingress stage 64 comprises a third plurality, M, of AWGs 72, each AWG 72 comprising an eighth plurality, N, of input ports 16 and a second plurality, L, of output ports 70. The intermediate stage 66 comprises a said second plurality, L, of AWGs 82, each comprising a said third plurality, M, of input ports 78 and a said third plurality, M, of output ports 80. Each input port 78 of each AWG 82 is provided with a wavelength tunable wavelength converter 26 arranged to receive an optical signal packet at a respective wavelength and to output an optical signal packet at a respective one of a said third plurality, M, of intermediate wavelengths. The egress stage 68 comprises a said third plurality, M, of AWGs 76, each comprising a said second plurality, L, of input ports 74 and a said eighth plurality, N, of output ports 18. Each input port 74 is provided with a wavelength tunable wavelength converter 26 arranged to receive an optical signal packet at a respective wavelength and to output an optical signal packet at one of a said eighth plurality, N, of output wavelengths.

The ingress stage 64, intermediate stage 66 and egress stage 68 of the optical switch fabric 62 are arranged as a Clos network.

The controller 32 is arranged to set the input wavelength for the optical transmitter 12 and to set the intermediate wavelength and the output wavelength of the respective wavelength converters 26 of the intermediate stage 66 and the egress stage 68.

Figure 4:
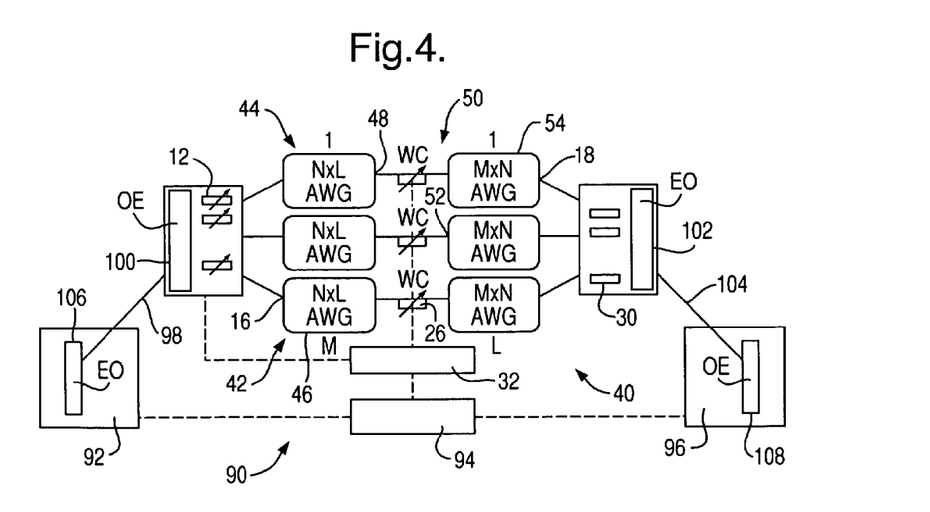
FIG. 4 is a schematic representation of a communications network router according to a fourth embodiment of the invention.

Referring to FIG. 4, a fourth embodiment of the invention provides a communications network router 90. The router 90 comprises at least one input module 92, at least one output module 96, a packet switch 40 and a scheduler 94. In this example, the packet switch 40 takes the form of the packet switch 40 shown in FIG. 2 but it will be appreciated that the packet switch 10 of FIG. 1 may equally be used.

The input module 92 is arranged to receive at least one electrical signal packet to be routed. The input module 92 is arranged to provide the received electrical signal packet to a respective optical transmitter 12. The output module 96 is arranged to output at least one electrical signal packet. The output module 96 is arranged to receive an electrical signal packet from a respective optical detector 30.

The scheduler 94 is arranged to select an input wavelength for the optical transmitter 12 and to select an output wavelength for a respective wavelength converter 26 to thereby select a path across the optical switch fabric 42 from the optical transmitter 12 to the respective optical detector 30. The scheduler 94 is arranged to generate a wavelength control signal indicative of the selected input wavelength and the selected output wavelength and to transmit the control signal to the controller 32.

In this example, the optical transmitters 12 are provided outside of the input module 92 and the optical detectors 30 are provided outside of the output module 96. The input module 92 and the output module 96 of this example comprise line cards. The router 90 further comprises input electrical-to-optical (EO) signal conversion apparatus 106, an input optical link 98, and an input optical-to-electrical (OE) signal conversion apparatus 100. The input EO conversion apparatus 106 is provided within the input module 92 and is arranged to receive the electrical signal packet and to convert it into an input optical signal packet. The input optical link 98 is provided between the input EO conversion apparatus 106 and the input OE conversion apparatus 100, and is arranged to deliver the input optical signal packet to the input OE conversion apparatus. The input OE conversion apparatus 100 is arranged to receive an input optical signal packet and to convert it into a corresponding electrical signal packet to be switched. The input OE apparatus 100 is arranged to provide the electrical signal packet to be switched to a respective optical transmitter 12.

It will be appreciated that a plurality of electrical signal packets may be received at the input module 92 and provided to respective ones of the optical transmitters 12 for switching by the packet switch 40. It will also be appreciated that the optical router 90 may comprise a plurality of input modules 92 and a plurality of output modules 96.

The optical detectors 30 are provided outside the output module 96 and the router 90 further comprises output EO conversion apparatus 102, an output optical link 104, and output OE conversion apparatus 108. The output EO conversion apparatus 102 is arranged to receive an output electrical signal packet from a respective optical detector 30 and to convert the electrical signal packet into an output optical signal packet. The output OE conversion apparatus 108 is provided within the output module 96. The output optical link 104 is provided between the output EO conversion apparatus 102 and the output OE conversion apparatus 108, and is arranged to deliver the output optical signal packet to the output OE conversion apparatus 108. The output OE conversion apparatus 108 is arranged to receive the output optical signal packet and to convert it into a corresponding electrical signal packet to be output from the router 90.

Figure 5:
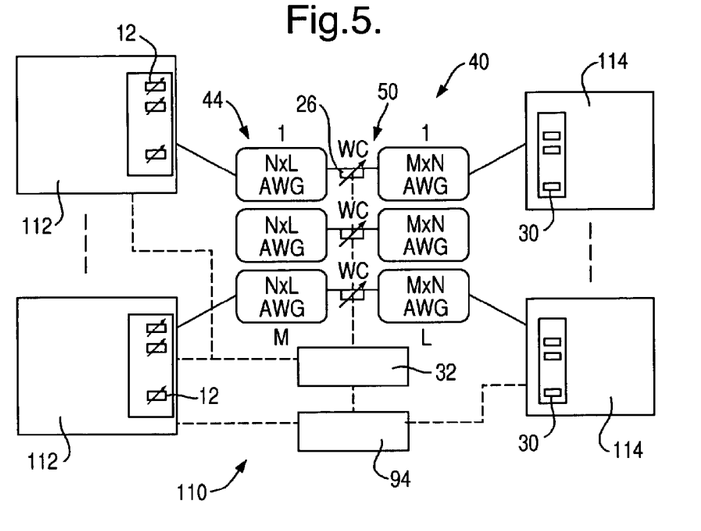
FIG. 5 is a schematic representation of a communications network router according to a fifth embodiment of the invention.

A fifth embodiment of the invention provides a communications network router 110, as shown in FIG. 5. The router 110 is substantially the same as the router 90 of the previous embodiment, with the following modifications. The same reference numbers are retained for corresponding features.

In this embodiment, the optical transmitters 12 are provided within respective ones of a plurality of input modules 112 and the optical detectors 30 are provided within respective ones of a plurality of output modules 114.

This example shows a packet switch 40 as shown in FIG. 2 but it will be appreciated that the packet switch 10 of FIG. 10 may equally be used.

In this embodiment, the scheduler 94 is arranged to select an input wavelength for each optical transmitter 12 and an output wavelength for each wavelength converter 26. The scheduler selects an input wavelength for a respective optical transmitter 12 and an output wavelength for a respective wavelength converter 26 in order to select a path across the switch fabric 52 from the optical transmitter 12 to a respective optical detector 30. The scheduler 94 is arranged to generate a wavelength control signal indicative of the selective wavelengths and to transmit the control signal to the controller 32.

Figure 6:
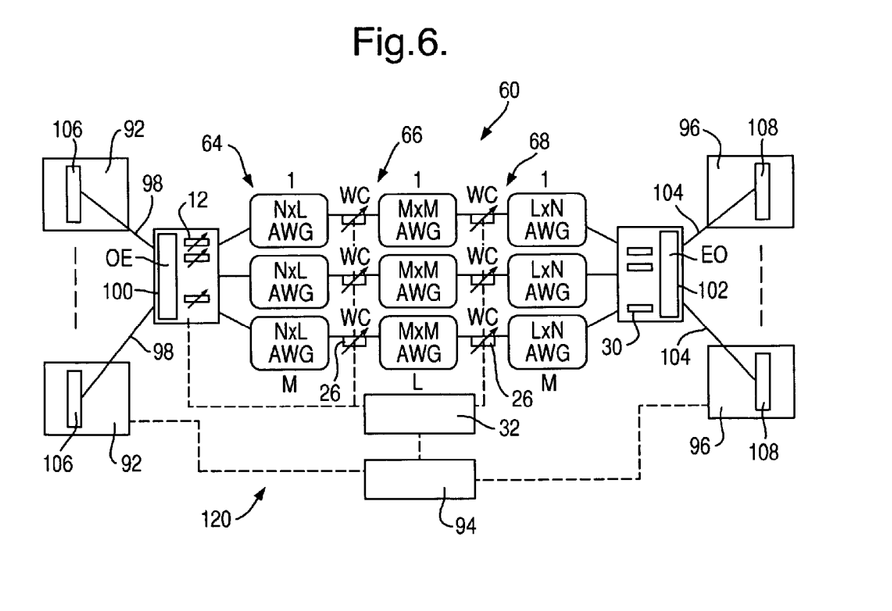
FIG. 6 is a schematic representation of a communications network router according to a sixth embodiment of the invention.

A sixth embodiment of the invention provides a communications network router 120 as shown in FIG. 6. The router 120 is substantially the same as the router 90 of FIG. 4, with the following modifications. The same reference numbers are retained for corresponding pictures.

In this embodiment, the router 120 comprises of plurality of input modules 92. The router 120 comprises of packet switch 60 as shown in FIG. 3.

The scheduler 94 of this embodiment is arranged to select an input wavelength for each optical transmitter 12, an intermediate wavelength for each wavelength converter 26 of the intermediate stage 66 and an output wavelength for each wavelength converter 26 of the egress stage 68. The scheduler 94 selects an input wavelength, intermediate wavelength and output wavelength for a respective optical transmitter 12 in order to select a path across the optical switch fabric 62 to a respective output detector 30. The scheduler 94 is arranged to generate a wavelength control signal indicative of the selected wavelengths and to transmit the control signal to the controller 32.

Figure 7:
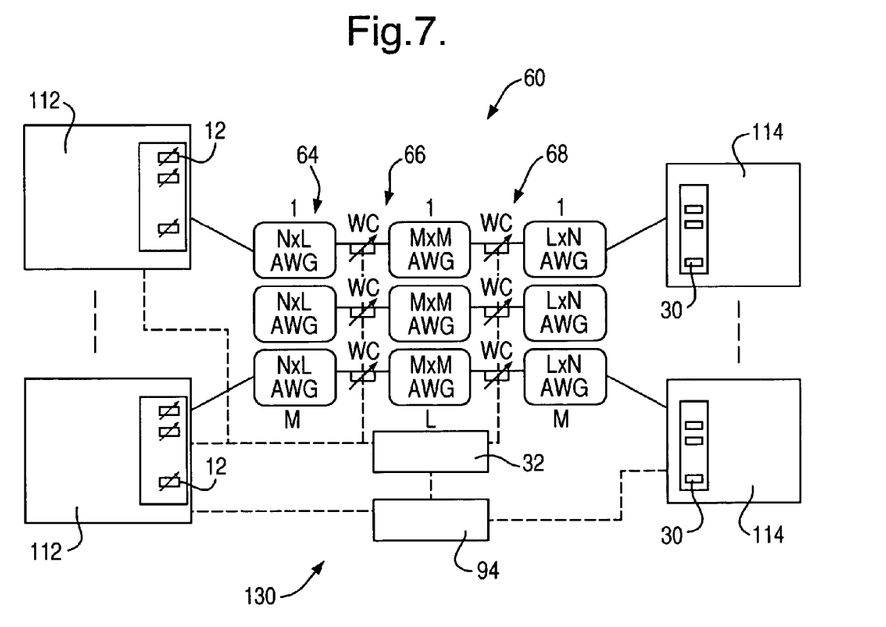
FIG. 7 is a schematic representation of a communications network router according to a seventh embodiment of the invention.

FIG. 7 shows a communications network router 130 according to a seventh embodiment of the invention. The router 130 is substantially the same as the router 120 of FIG. 6, with the following modifications. The same reference numbers are retained for corresponding features.

In this embodiment, the optical transmitters 12 are provided within respective ones of a plurality of input modules 112 and the optical detectors 30 are provided within respective ones of a plurality of input modules 112 and the optical detectors 30 are provided within respective ones of a plurality of output modules 114.

Figure 8:
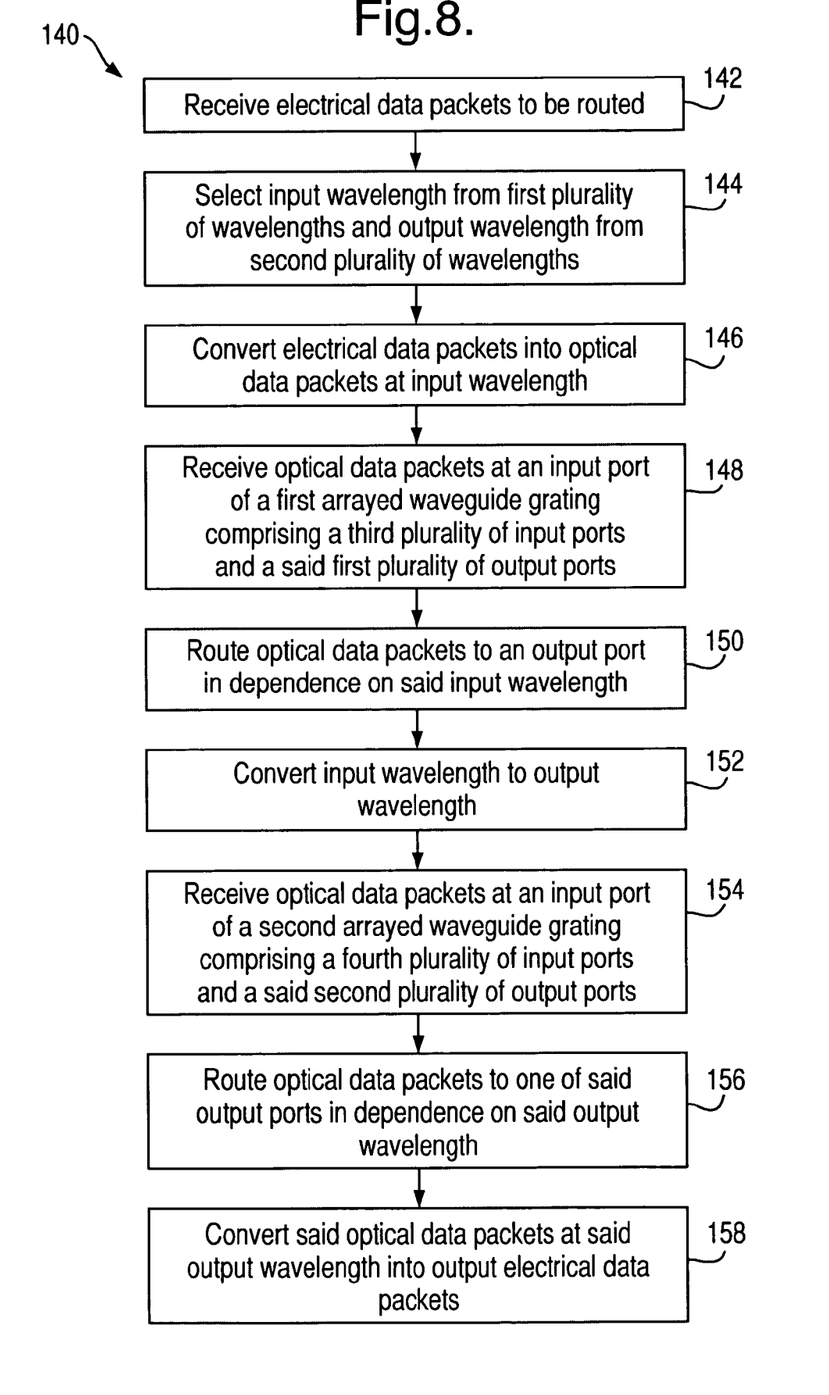
FIG. 8 shows the steps of a method of routing electrical data packets according to an eighth embodiment of the invention.

FIG. 8 shows the steps of a method 140 of routing electrical signal packets according to an eighth embodiment of the invention. The method 140 comprises the following steps:

receiving at least one electrical signal packet to be routed 142;

selecting an input wavelength from a first plurality of wavelengths and an output wavelength from a second plurality of wavelengths 144;

converting said electrical signal packet into at least one corresponding optical signal packet at said input wavelength 146;

receiving said optical signal packet at an input port of a first wavelength selective router comprising a third plurality of input ports and a said first plurality of output ports 148, and routing said at least one optical signal packet to one of said output ports in dependence on said input wavelength 150;

subsequently converting said input wavelength to said output wavelength 152;

receiving said at least one optical signal packet at an input port of a second wavelength selective router comprising a fourth plurality of input ports and a said second plurality of output ports 154, and routing said at least one optical signal packet to one of said output ports in dependence on said output wavelength 156; and subsequently converting said at least one optical signal packet at said output wavelength into at least one corresponding output electrical signal packet 158.

Figure 9:
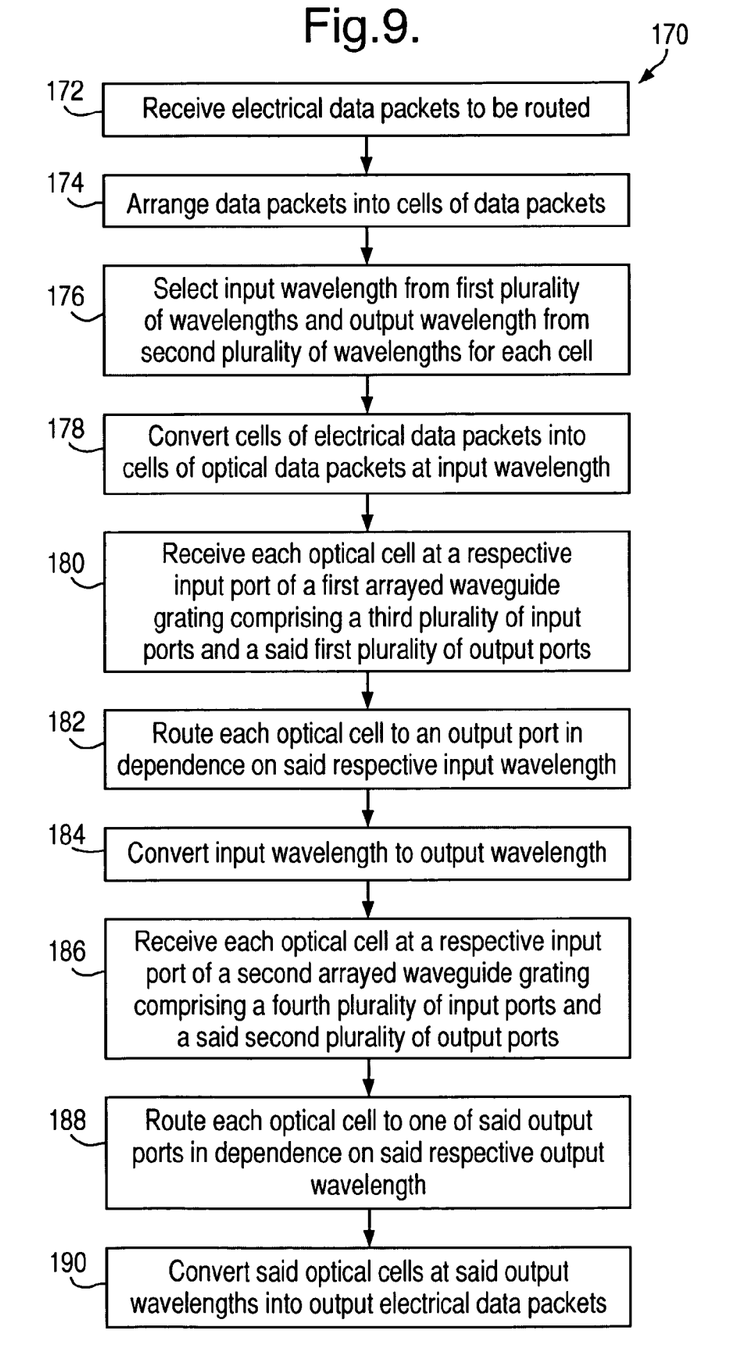
FIG. 9 shows the steps of a method of routing electrical data packets according to a ninth embodiment of the invention.

The steps of a method 170 of routing electrical signal packets according to a ninth embodiment of the invention are shown in FIG. 9. The method 170 comprises the following steps:

receiving a plurality of electrical signal packets to be routed 172;

arranging said electrical signal packets into groups of signal packets 174;

selecting a said input wavelength and a said output wavelength for each said group of electrical signal packets 176;

converting each said group of electrical signal packets into a group of optical signal packets at a respective said input wavelength 178;

receiving each said group of optical signal packets at a respective input port of said first wavelength selective router 180 and routing each said group of optical signal packets to a respective said output port in dependence on said respective input wavelength 182;

subsequently converting each said input wavelength to said respective output wavelength 184;

receiving each said group of optical signal packets at a respective input port of said second wavelength selective router 186 and routing each said group of optical signal packets to a respective said output port in dependence on said respective output wavelength 188; and subsequently converting each said group of optical signal packets at said output wavelengths into corresponding output electrical signal packets 190.

Figure 10:
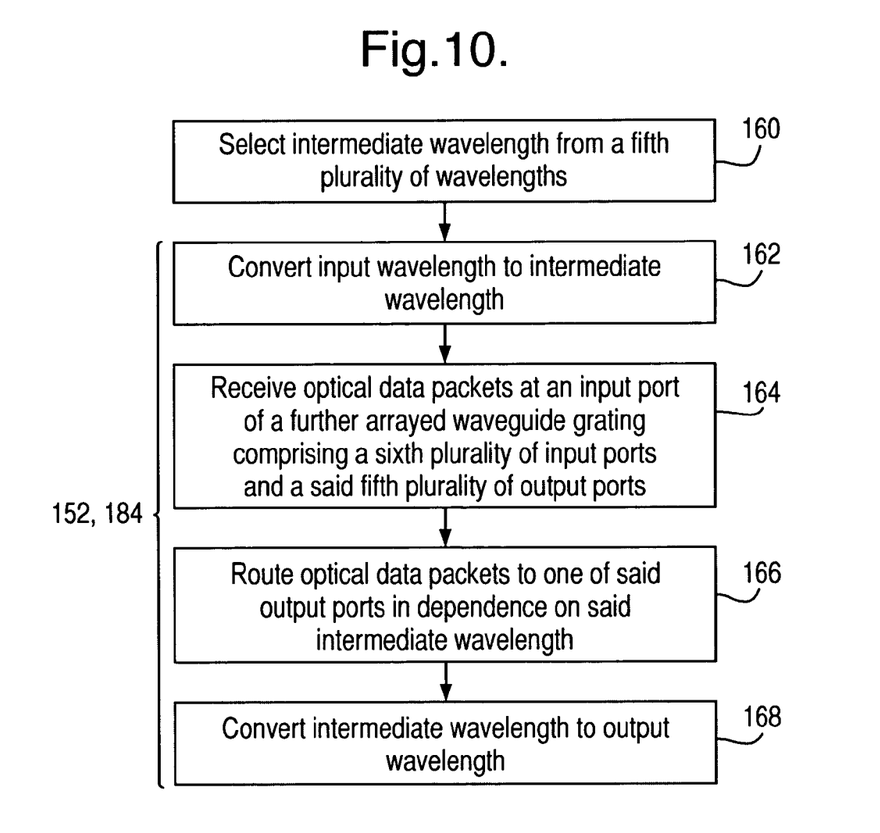
FIG. 10 shows further steps of a method of routing electrical data packets according to a tenth embodiment of the invention, which may be based on either the method of FIG. 8 or FIG. 9.

FIG. 10 shows further steps of a method of routing electrical data packets according to a tenth embodiment of the invention, which may be based on either the method of FIG. 8 or FIG. 9.

In this embodiment, the method further comprises selecting an intermediate wavelength from a fifth plurality of wavelengths 160 and the step 152, 184 of converting the input wavelength into an output wavelength comprises:

converting said input wavelength to said intermediate wavelength 162;

receiving said at least one optical signal packet at an input port of a further wavelength selective router comprising a sixth plurality of input ports and a said fifth plurality of output ports 164, and routing said at least one optical signal packet to one of said output ports in dependence on said intermediate wavelength 166; and subsequently converting said intermediate wavelength into said output wavelength 168.

Figure 11:
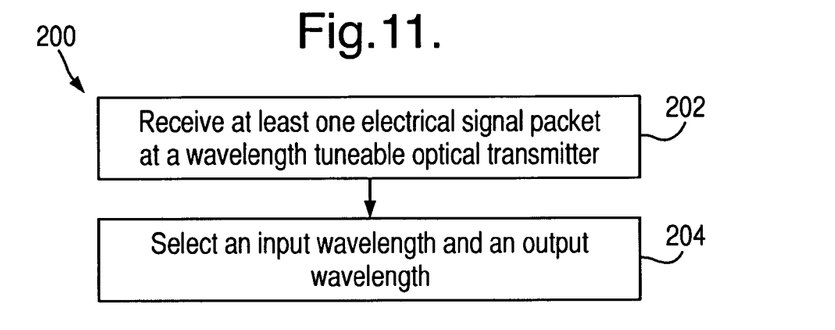
FIG. 11 shows the steps of a method of scheduling electrical signal packets for routing in a communications network router according to an eleventh embodiment of the invention.

The steps of a method 200 of scheduling electrical signal packets for routing in a communications network router according to an eleventh embodiment of the invention are shown in FIG. 11.

The method 200 is for scheduling electrical signal packets for routing in a communications network router comprising a packet switch, optical detectors and an optical switch fabric provided between said transmitters and said detectors. The packet switch comprises a first plurality of wavelength tunable optical transmitters arranged to transmit at one of a second plurality of input wavelengths. The router comprises a third plurality of optical detectors. The optical switch fabric comprises an ingress stage and an egress stage. The ingress stage comprises a fourth plurality of wavelength selective routers. The egress stage comprises a fifth plurality of wavelength selective routers and a sixth plurality of wavelength tunable wavelength converters arranged to convert an optical signal at a said input wavelength to an output wavelength. The method 200 is therefore suitable for scheduling electrical signal packets for routing in any of the above described communications network routers 90, 110, 120, 130.

The method 200 comprises:

receiving at least one electrical signal packet at a said wavelength tunable optical transmitter 202; and selecting a said input wavelength and a said output wavelength 204. Selecting the input wavelength and the output wavelength selects a path across the optical switch fabric 42, 62 from the optical transmitter 12 such that said optical transmitter is connected to only one optical detector 30, and the optical detector is connected only to that optical transmitter 12.

Figure 12:
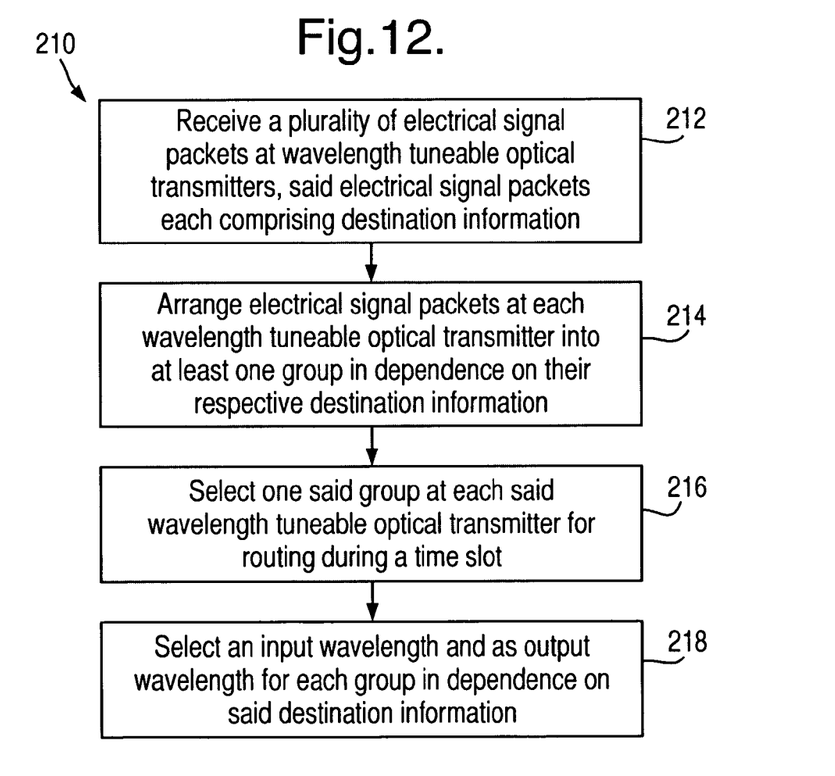
FIG. 12 shows the steps of a method of scheduling electrical signal packets for routing in a communications network router according to a twelfth embodiment of the invention.

FIG. 12 shows the steps of a method 210 of scheduling electrical signal packets for routing in a communications network router according to a twelfth embodiment of the invention.

The method 210 is substantially the same as the method 200 shown in FIG. 11 and is for the same type of communications network router. The method 210 comprises:

receiving a plurality of electrical signal packets at said wavelength tunable optical transmitters, said electrical signal packets each comprising destination information 212;

arranging said electrical signal packets at each said wavelength tunable optical transmitter into at least one group in dependence on their respective said destination information 214;

selecting one said group at each said wavelength tunable optical transmitter for routing during a time slot 216; and selecting a said input wavelength and a said output wavelength for each said group in dependence on said destination information 218.

In the step 212 of receiving a plurality of electrical signal packets at the optical transmitters the electrical signal packets are arranged into queues at respective optical transmitters, the signal packets in a queue having the same destination.

Electrical signal packets at more than one optical transmitter may have the same destination and therefore compete to be routed to the same optical detector. In addition, the router has a maximum optical signal bandwidth, constraining the number of signal packets which may be routed during a single time slot, and the scheduler is arranged to allocate the bandwidth between the signal packets according to a priority level of the signal packets.

The step 216 of selecting a group for routing during a time slot comprises:
checking the status of the queues at each optical transmitter;
guaranteeing Quality of Services parameters, such as delay, jitter, bandwidth and fairness; and
resolving any contention between signal packets with the same destination, to determine which signal packets are to be routed to the respective optical detector.

The invention claimed is:

1. A packet switch comprising:
a plurality of wavelength tunable optical transmitters each arranged to receive at least one electrical signal packet to be switched, each said optical transmitter being arranged to convert said at least one received electrical signal packet into a corresponding optical signal packet at one of a plurality of input wavelengths;
an optical switch fabric arranged to receive said at least one optical signal packet and comprising:
an ingress stage comprising a first plurality of wavelength selective routers; and
an egress stage comprising a second plurality of wavelength selective routers and a first plurality of wavelength tunable wavelength converters each respectively provided before an input port of a wavelength selective router of the second plurality of wavelength selective routers, each said wavelength tunable wavelength converter being arranged to receive an optical signal at a respective said input wavelength and to output a corresponding optical signal at a respective output wavelength;
a plurality of optical detectors each arranged to receive an optical signal packet from said egress stage and to convert said optical signal packet into an output electrical signal packet;
a controller arranged to configure a path across said optical switch fabric connecting a said optical transmitter to a respective said optical detector, said controller being arranged to set said input wavelength for said optical transmitter and to set said output wavelength for a respective said wavelength converter in said path; and
wherein the packet switch is operable to:
receive a plurality of electrical signal packets at the plurality of wavelength tunable optical transmitters, each electrical signal packet of the plurality of electrical signal packets comprising destination information;
arrange each electrical signal packet of the plurality of electrical signal packets at each wavelength tunable optical transmitter of the plurality of wavelength tunable optical transmitters into at least one group in dependence on their respective said destination information;
select one of the at least one groups at each of the plurality of wavelength tunable optical transmitters for routing during a time slot; and
select an input wavelength and an output wavelength for each said group in dependence on said destination information.

2. A packet switch as claimed in claim 1, wherein each of the first plurality of wavelength selective routers in the ingress stage comprise a plurality of input ports and a plurality of output ports, and each of the second plurality of wavelength selective routers in the egress stage comprise a plurality of input ports and a plurality of output ports, each said wavelength converter being coupled between its respective said input port and a respective one of the plurality of output ports of one of the plurality of wavelength selective routers in the ingress stage and being arranged to receive an optical signal packet at a respective wavelength and to output an optical signal packet at a respective output wavelength.

3. A packet switch as claimed in claim 2, wherein said optical switch fabric further comprises at least one intermediate stage provided between said ingress stage and said egress stage, said intermediate stage comprising a third plurality of wavelength selective routers each comprising a plurality of input ports and a plurality of output ports, each said input port of each wavelength selective router of the third plurality of wavelength selective routers being provided with a wavelength tunable wavelength converter arranged to receive an optical signal packet at a respective wavelength and to output an optical signal packet at a respective output wavelength, each said wavelength converter provided with each input port of each wavelength selective router of the third plurality of wavelength selective routers being coupled between its respective said input port and a respective said output port of a preceding switch stage.

4. A packet switch as claimed in claim 3, wherein said ingress stage, said egress stage and said at least one intermediate stage are arranged as a non-blocking switch network.

5. A packet switch as claimed in claim 4, wherein said non-blocking switch network comprises a Clos network.

6. A packet switch as claimed in claim 1, wherein each wavelength selective router of the first and second plurality of wavelength selective routers comprise arrayed waveguide gratings.

7. A communications network router comprising:
at least one input module arranged to receive at least one electrical signal packet to be routed;
at least one output module arranged to output at least one electrical signal packet;
a packet switch as claimed in claim 1; and
a scheduler,
said at least one input module being arranged to provide said received at least one electrical signal packet to a respective said wavelength tunable optical transmitter and said at least one output module being arranged to receive at least one electrical signal packet from a respective said optical detector, and
said scheduler being arranged to select a said input wavelength for said optical transmitter and to select a said output wavelength for a respective said wavelength converter to thereby select a path across said optical switch fabric from said optical transmitter, said scheduler being arranged to generate a wavelength control signal indicative of said selected wavelengths and to transmit said control signal to said controller.

8. A method of routing electrical signal packets, the method comprising:
receiving at least one electrical signal packet to be routed;
selecting an input wavelength from a first plurality of wavelengths and an output wavelength from a second plurality of wavelengths;
converting said electrical signal packet into at least one corresponding optical signal packet at said input wavelength;
receiving said optical signal packet at an input port of a first wavelength selective router comprising a first plurality of input ports and a first plurality of output ports, and routing said at least one optical signal packet to one output port of the first plurality of output ports in dependence on said input wavelength; subsequently converting said input wavelength to said output wavelength;
receiving said at least one optical signal packet at an input port of a second wavelength selective router comprising a second plurality of input ports and a second plurality of output ports, and routing said at least one optical signal packet to one output port of the second plurality of output ports in dependence on said output wavelength; and subsequently converting said at least one optical signal packet at said output wavelength into at least one corresponding output electrical signal packet;

receiving a plurality of electrical signal packets to be routed, said electrical signal packets each comprising destination information;

arranging said electrical signal packets into at least one group in dependence on their respective said destination information;

selecting one said group for routing during a time slot; and selecting a said input wavelength and a said output wavelength for each said group in dependence on said destination information.

9. A method as claimed in claim 8, wherein said method further comprises selecting an intermediate wavelength from a third plurality of wavelengths, and said step of subsequently converting said input wavelength to an output wavelength comprises:

converting said input wavelength to said intermediate wavelength; receiving said at least one optical signal packet at an input port of a further wavelength selective router comprising a third plurality of input ports and a third plurality of output ports, and routing said at least one optical signal packet to one output port of the third plurality of output ports in dependence on said intermediate wavelength; and subsequently converting said intermediate wavelength into said output wavelength.

10. A method as claimed in claim 8, wherein said method comprises:

receiving a plurality of electrical signal packets to be routed; arranging said electrical signal packets into groups of signal packets; selecting a said input wavelength and a said output wavelength for each said group of electrical signal packets;

converting each said group of electrical signal packets into a group of optical signal packets at a respective said input wavelength;

receiving each said group of optical signal packets at a respective input port of said first wavelength selective router and routing each said group of optical signal packets to a respective said output port in dependence on said respective input wavelength;

subsequently converting each said input wavelength to said respective output wavelength;

receiving each said group of optical signal packets at a respective input port of said second wavelength selective router and routing each said group of optical signal packets to a respective said output port in dependence on said respective output wavelength; and subsequently converting each said group of optical signal packets at said output wavelengths into corresponding output electrical signal packets.

11. A method as claimed in claim 8, wherein said first and second wavelength selective routers comprise arrayed waveguide gratings.

12. A method of scheduling electrical signal packets for routing in a communications network router comprising a packet switch comprising a first plurality of wavelength tunable optical transmitters arranged to transmit at one of a first plurality of input wavelengths, a plurality of optical detectors, and an optical switch fabric provided between the first plurality of wavelength tunable optical transmitters and the plurality of optical detectors and comprising an ingress stage comprising a first plurality of wavelength selective routers and an egress stage comprising a second plurality of wavelength selective routers and a plurality of wavelength tunable wavelength converters arranged to convert an optical signal at an input wavelength to an output wavelength, said method comprising:

receiving at least one electrical signal packet at one of the wavelength tunable optical transmitters of the first plurality of wavelength tunable optical transmitters;

selecting a said input wavelength and a said output wavelength to thereby select a path across said optical switch fabric from the one of the wavelength tunable optical transmitters of the first plurality of wavelength tunable optical transmitters that received the at least one electrical signal packet such that said optical transmitter is connected to only one said optical detector, and said optical detector is connected only to said optical transmitters;

receiving a plurality of electrical signal packets at the first plurality of wavelength tunable optical transmitters, said electrical signal packets each comprising destination information;

arranging said electrical signal packets at each of the plurality of wavelength tunable optical transmitters into at least one group in dependence on their respective said destination information;

selecting one said group at each of the plurality of wavelength tunable optical transmitters for routing during a time slot; and selecting a said input wavelength and a said output wavelength for each said group in dependence on said destination information.

* * * * *